US006289302B1

United States Patent
Kuo (10) Patent No.: US 6,289,302 B1
(45) Date of Patent: Sep. 11, 2001

(54) CHINESE GENERATION APPARATUS FOR MACHINE TRANSLATION TO CONVERT A DEPENDENCY STRUCTURE OF A CHINESE SENTENCE INTO A CHINESE SENTENCE

(75) Inventor: June-Jei Kuo, Taipei (TW)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/371,788

(22) Filed: Aug. 10, 1999

(30) Foreign Application Priority Data

Oct. 26, 1998 (JP) .................................................. 10-303775

(51) Int. Cl.[7] .................................................. G06F 17/28
(52) U.S. Cl. ........................................................ 704/2
(58) Field of Search ................................ 704/2, 3, 4, 5, 704/6, 7–8, 277; 707/530, 536

(56) References Cited

U.S. PATENT DOCUMENTS

| 5,075,851 | * | 12/1991 | Kugimiya et al. | 704/7 |
| 5,224,040 | * | 6/1993 | Tou | 704/7 |
| 5,285,386 | * | 2/1994 | Kuo | 704/2 |
| 5,384,702 | * | 1/1995 | Tou | 704/8 |
| 5,873,055 | * | 2/1999 | Okunishi | 704/2 |
| 6,002,997 | * | 12/1999 | Tou | 704/2 |
| 6,014,615 | * | 1/2000 | Chen | 704/3 |

FOREIGN PATENT DOCUMENTS

| 324804 | 1/1998 | (CN) | G06F/15/38 |
| 3-102568 | 4/1991 | (JP) | G06F/15/38 |

OTHER PUBLICATIONS

English language abstract of JP 3–102568.

* cited by examiner

*Primary Examiner*—Patrick N. Edouard
(74) *Attorney, Agent, or Firm*—Greenblum & Bernstein, P.L.C.

(57) ABSTRACT

The Chinese generation apparatus for machine translation utilizes statistic data for Chinese generation instead of a large number of semantic, grammatical related rules, the statistic data being retrieved from a tagged Chinese corpus. In order to overcome the problem that a large number of semantic or grammatical rules are needed in Chinese generation, the constitution of a Chinese sentence is divided into basic sentence pattern item and other items. The probability of the possibly generated basic sentence pattern of each Chinese verb and the location probability of the other item in the basic sentence pattern are initially retrieved from the Chinese corpus and are stored in the buffer unit. The best basic sentence pattern and the location of the other items can be found in accordance with each constitution item of the intermediate form of Chinese and the statistic information in the buffer unit with the use of branch-and-bound method, so that the most suitable Chinese sentence can be generated.

1 Claim, 13 Drawing Sheets

| ARGUMENT ITEM | POSSIBLE SENTENCE PATTERN | SLOT1 | | SLOT2 | | SLOT3 | | SLOT4 | | SLOT5 | | SLOT6 | |
|---|---|---|---|---|---|---|---|---|---|---|---|---|---|
| | | CASE ARRANGEMENT | PROBABILITY | CASE ARRANGEMENT | PROBABILITY | CASE ARRANGEMENT | PROBABILITY | CASE ARRANGEMENT | PROBABILITY | CASE ARRANGEMENT | PROBABILITY | CASE ARRANGEMENT | PROBABILITY |
| 送 (SEND) | SVO (0.41) | time | 0.2 | time | 0.39 | | | loc-to | 0.25 | | | | |
| | | Purp | 0.06 | loc | 0.09 | | | | | | | | |
| | | | | Time-at | 0.21 | | | | | | | | |
| | | | | time, time-at | 0.17 | | | | | | | | |
| | SVOO (0.3) | | | time, time-at loc | 0.07 | | | | | | | | |
| | SVOC (0.18) | | | time | 0.16 | | | | | | | | |
| | SVOOC (0.11) | | | time | 0.24 | | | | | | | | |
| | | | | time | 0.11 | | | | | | | | |
| .. | .. | .. | .. | .. | .. | .. | .. | .. | .. | .. | .. | .. | .. |

LOC:LOCATION CASE , PURP:PURPOSE CASE

FIG.5

| CASE MARKER | JAPANESE MARKER | ARGUMENT SEMANTIC CODE | SEMANTIC CODE | PHRASE HEAD MARKER | PHRASE TAIL MARKER |
|---|---|---|---|---|---|
| LOCATION | | S383<br>S232 | | 在 | |
| LOCATION | | | | 在 | |
| LOC_FROM | | | | 從 | |
| LOC_TO | | | | 到 | |
| STATE_FROM | | | | 從 | |
| CAUSE | | S2989 | | 依 | 不同而 |
| CAUSE | | | | 由於 | |
| DURATION | | | | 在 | 之中 |
| INSTRUMENT | | | | 藉著 | |
| INSTRUMENT | | | | 用 | |
| CONDITION | | | | 在 | 的情況下 |
| PURPOSE | | | | 為了 | |
| : | : | : | : | : | : |
| ACCOMPANY | | | | 和 | |
| TIME-FROM | | | | 從 | |
| TIME-TO | | | | 到 | |

BLANK: ACCEPT FOR ANY DATA

FIG.6

CHINESE DEPENDENCY STRUCTURE

FIG. 7A

PHRASE STRUCTURE OF MAIN ITEM SPREADING
UNIT AFTER BEING SPREAD

CHINESE DEPENDENCY STRUCTURE
FIG.10A

PHRASE STRUCTURE OF BASIC ITEM
AFTER BEING SPREAD

FIG.10B

PHRASE STRUCTURE OF UNRESTRAINED
ITEM AFTER BEING SPREAD

FIG.10C

PHRASE STRUCTURE OF THE GENERATED SPECIAL
SENTENCE PATTERN

FIG.10D

THE GENERATED CHINESE PHRASE STRUCTURE

FIG. 10E

CHINESE GENERATION APPARATUS FOR MACHINE TRANSLATION TO CONVERT A DEPENDENCY STRUCTURE OF A CHINESE SENTENCE INTO A CHINESE SENTENCE

BACKGROUND OF THE INVENTION

1. Field of the Invention

This invention relates to a Chinese generation apparatus for machine translation, which utilizes statistic data instead of a large number of semantic and syntactic rules.

2. Description of the Related Art

In the 20th-century, people have to keep learning to prevent themselves from getting disconnected from the society. However, for most of the new knowledge are from foreign countries, document translation is important in the efficiency of foreign document reading. In order to improve the quality and efficiency of document translation, a recent trend is to use computer instead of human for a translation job. Such translation apparatus is commonly called a machine translation apparatus. In such a machine translation apparatus, the input language that is to be translated is known as the source language, while the output language that has been translated from the input language is known as the object language. For example, the source language of a Japanese-to-Chinese machine translation apparatus is Japanese, while the object language of the same is Chinese. Furthermore, the translation format used in the machine translation apparatus may be the direct form, the intermediate converting form or the pivot form, depending on the characteristic of the language to be translated. Generally, the intermediate converting form is the one which is commonly used.

Figure 8:
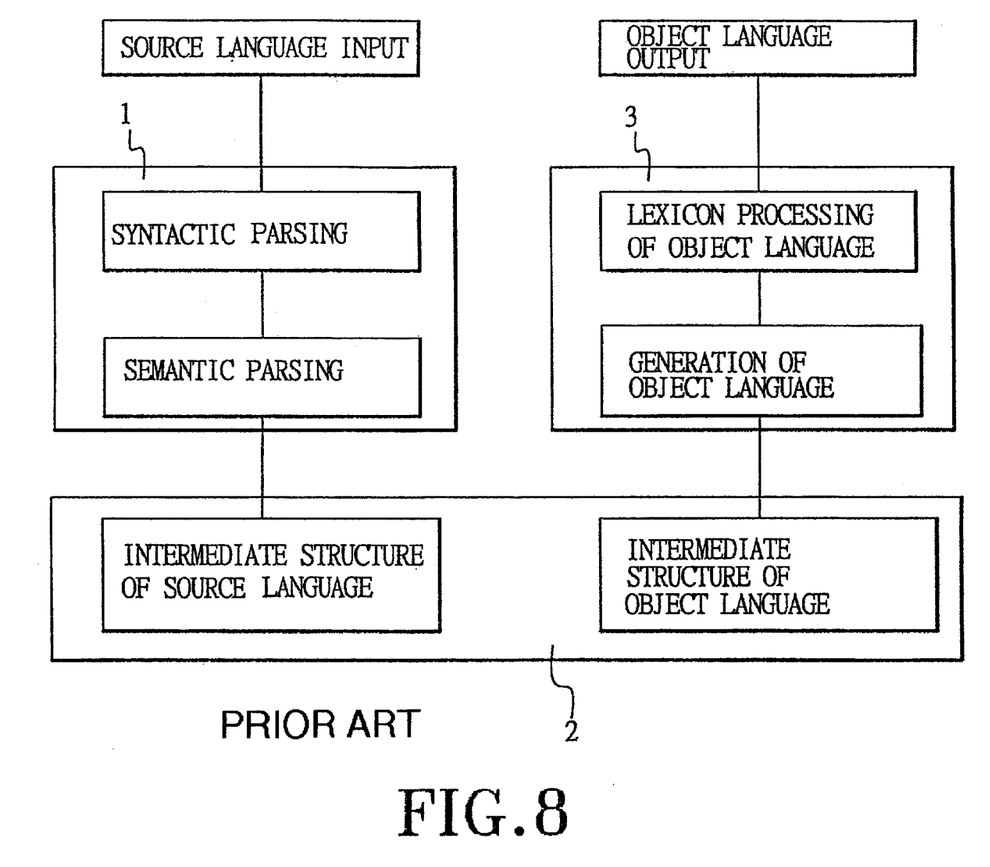
FIG. 8 is a schematic system block diagram of a conventional machine translation apparatus.

Referring to FIG. 8, a conventional machine translation apparatus employing the intermediate converting form includes a source language parsing unit 1, an intermediate structure converting unit 2, an object language generating unit 3 and a dictionary unit 4. However, the quality of machine translation depends on whether the input sentence is correctly parsed in the source language parsing unit 1, whether the difference between the source language and the object language is eliminated in the intermediate structure converting unit 2 (e.g. solve the difference in syntax or meaning, or the selection of the lexicon item translation), and whether an object language is correctly generated in the object language generating unit 3 in accordance with the syntactic rule of the object language.

However, a Chinese sentence will have different meanings as the locations of the lexicons in the sentence are changed. For example, in the sentences, [他*在卓子上*跳] (He is jumping on a table.) and [他跳*在卓子上*] (He jumps onto a table.), since the location of "在卓子上" (on a table) in the former sentence differs from that in the latter sentence, the two sentences have different meanings. Therefore, the arrangement of some lexicons in a Chinese sentence has a given sequence, and unless it is so, an incorrect Chinese sentence may be generated. The following is an example, wherein the time lexicon must be placed before the location lexicon. (correct Chinese sentence) 他*昨天** 在學校*吃飯. (Literally: He*yesdaty**at school*ate) (He ate dinner at school yesterday.) (incorrect Chinese sentence) 他*在學校**在學校*吃飯. (Literally: He*at school*yesdaty*ate)

On the other hand, the sequence of some lexicons in Chinese sentence is unrestrained. The following is an example, wherein the time lexicon may be placed before or after the subject. (the time lexicon is placed before the subject) 昨天他去學校. (Yesterday he went to school.) (the time lexicon is placed after the subject) 他昨天去學校. (He went to school yesterday.)

Figure 9:
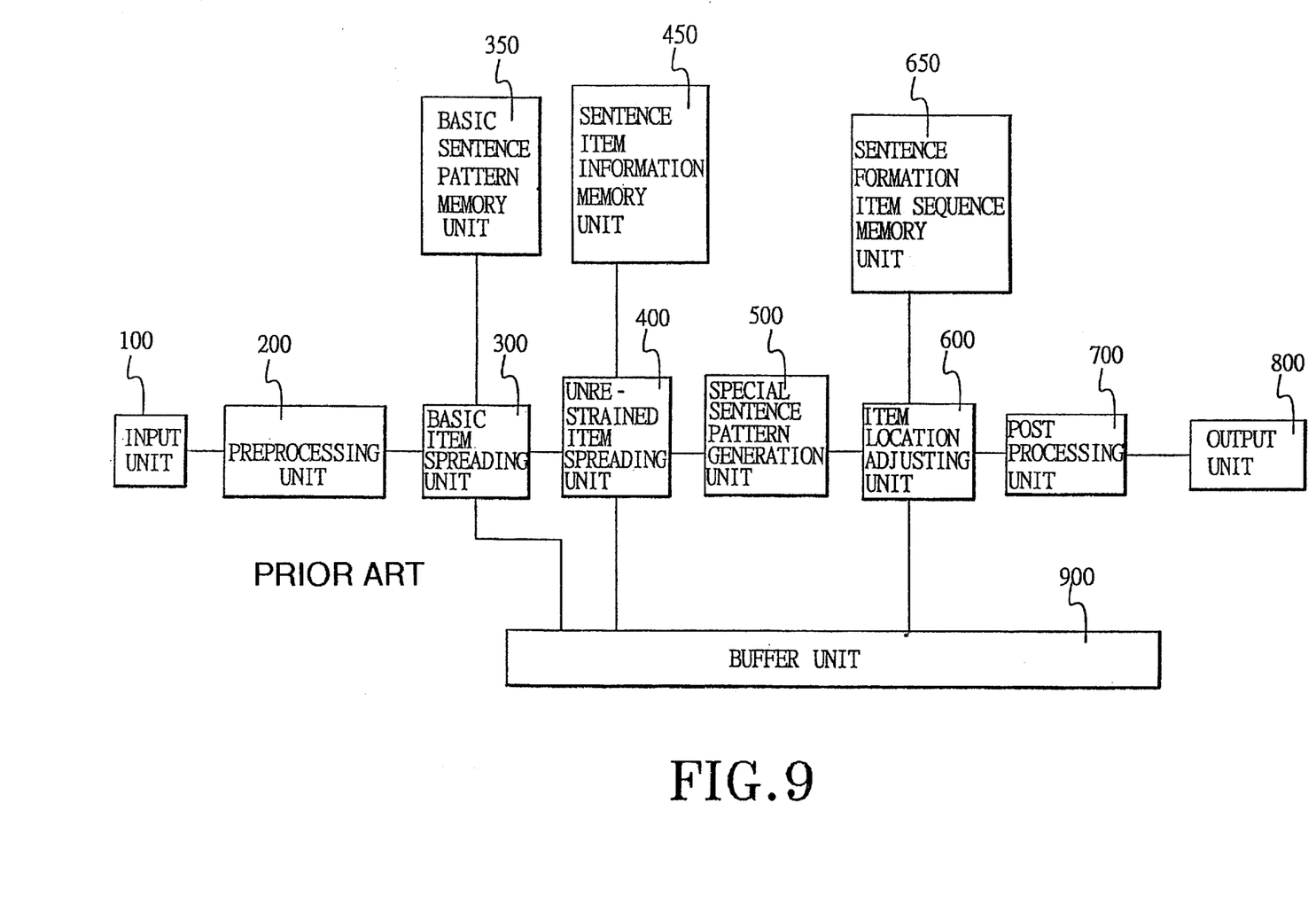
FIG. 9 is a schematic system block diagram of a conventional Chinese generation apparatus for machine translation.

Therefore, if the object language of a machine translation apparatus is Chinese, the most important problem to be solved is how to correctly determine the arrangement sequence of the lexicons in a Chinese sentence. Referring to FIG. 9, R.O.C. Pat. Publication No. 324804 discloses a Chinese generation apparatus for machine translation.

Figure 10A:
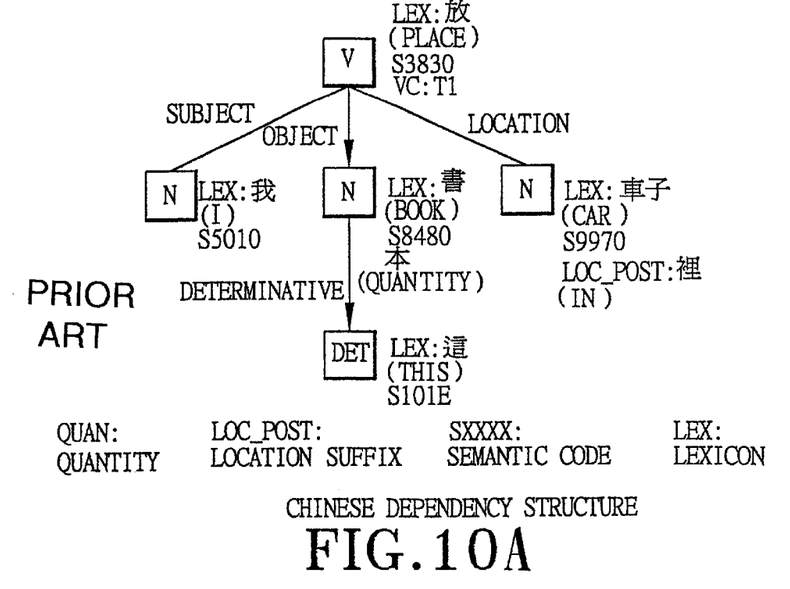
FIGS. 10A to 10E are schematic diagrams for explaining the process of the prior art.
Figure 10B:
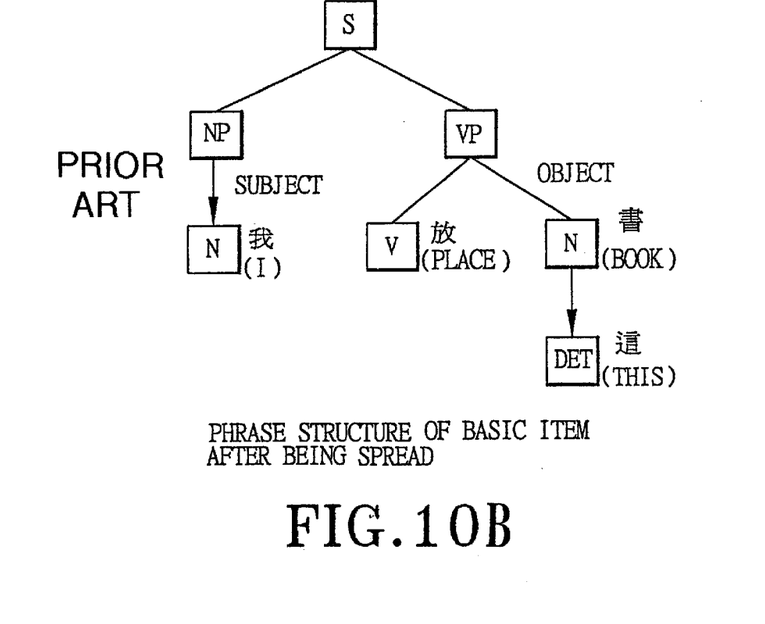

A preprocessing unit 200 of the Chinese generation apparatus in FIG. 9 recovers the subject node for the sub-structure which omits the subject in the Chinese sentence dependency structure that is input as shown in FIG. 10A and that is an intermediate structure with the use of dummy node. Next, a basic item spreading unit 300 generates a basic sentence structure including basic item as shown in FIG. 10B in accordance with the basic sentence pattern stored in the basic sentence pattern memory unit 350 with the use of the verb classification code of the main item (verb or adjective) of each of the sub-structure as the searching key.

Figure 10C:
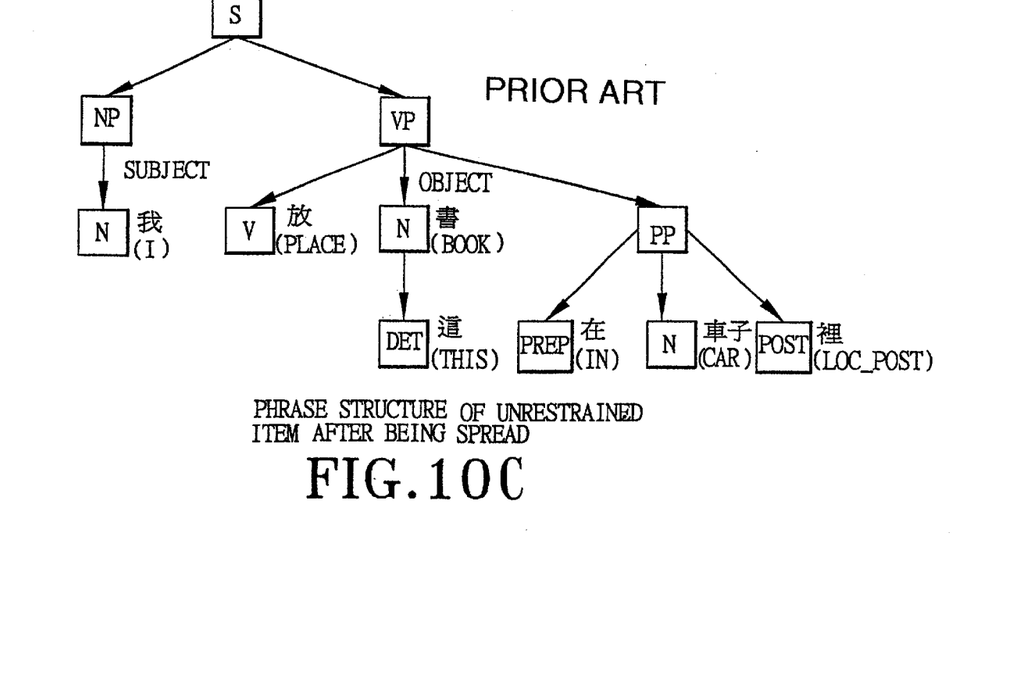

An unrestrained item spreading unit 400 retrieves the surface case marker of the phrase head, the surface case marker of the phrase tail and the sentence item slot in accordance with the sentence item information memory unit 450 with the use of the case marker of each unrestrained item, the surface case marker of the source language, the semantic dominating code and the semantic code of itself in the dependency structure as the searching key, and generates the sentence structure of each unrestrained item of FIG. 10C in accordance with the corresponding location of the sentence item slot location in the sentence structure.

Figure 10D:
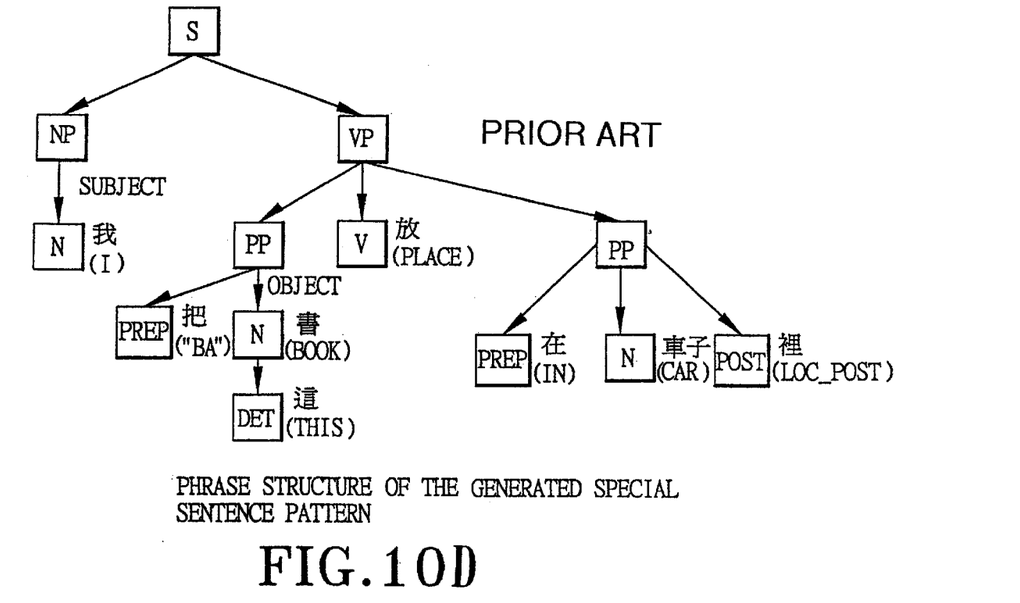
Figure 10E:
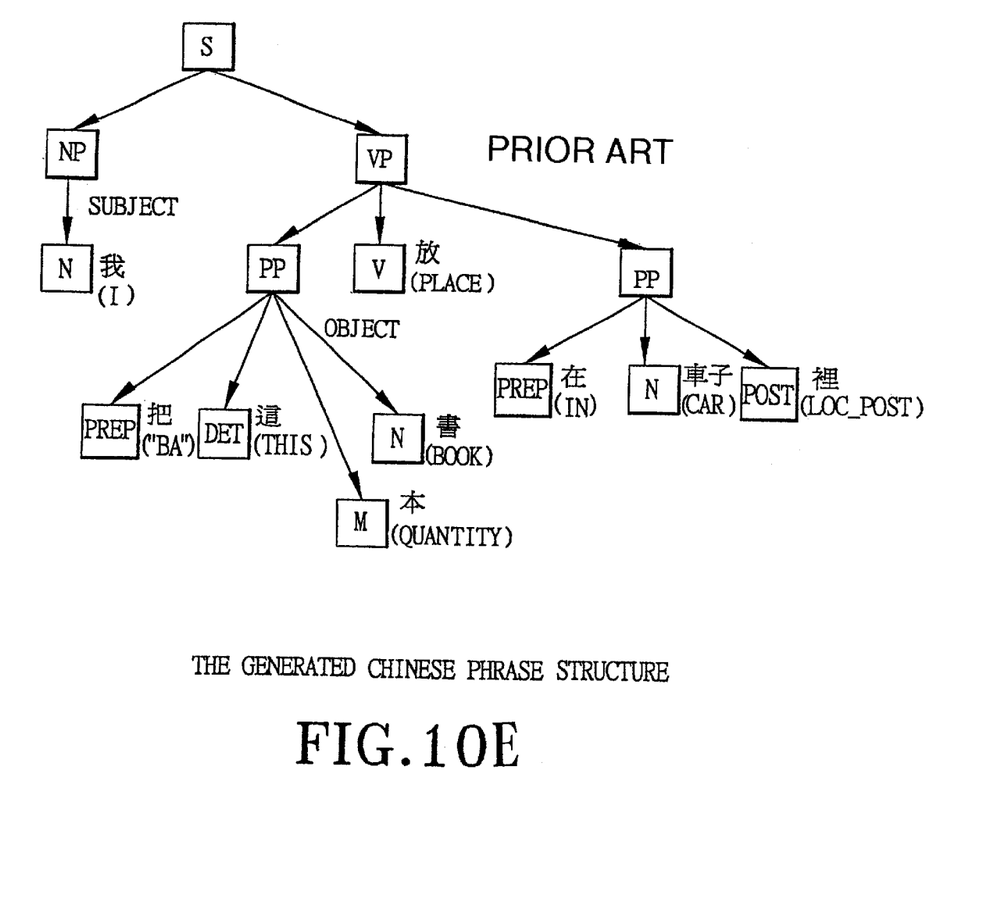

A special sentence pattern generation unit 500 generates the special sentence pattern sentence structure of FIG. 10D in accordance with the special sentence pattern attribute of each verb or adjective. As shown in FIG. 10E, an item location adjusting unit 600 orderly retrieves the item arrangement sequence limitation in each sentence item slot from the sentence formation item sequence memory unit 650 and adjusts the item arrangement sequence in each sentence item slot in the sentence structure. Afterwards, a post processing unit 700 performs the generation of other accessory item and punctuation on the sentence structure and lines the sentence structure. An output unit 800 outputs the translation result "我把這本書放在車子裡" (I put the book in the car.). A buffer unit 900 is used for temporarily storing the output from the basic item spreading unit 300, the unrestrained item spreading unit 400 and the item location adjusting unit 600.

The drawbacks that are associated with the aforementioned conventional Chinese generation apparatus for machine translation are as follows:

1. The verb or adjective of Chinese language has a plurality of Chinese basic sentence patterns that are possibly generated, for example, the verb "送" may be generated into the basic sentence patterns as follows. (Wherein S represents subject, V represents verb, O represents direct object or indirect object, and C represents complement)

SVOO: 我送他書. (I gave a book to him.)

SVOOC: 我送他書當作紀念. (I gave him a book as a souvenir.)

SVOC: 我送他回家. (I saw him home.)

SVO: 他會送命. (He will get killed.)

Therefore, the conventional Chinese generation apparatus for machine translation cannot solve the problem of the difference in the basic sentence patterns by the verb classification code. This problem must be solved by heuristic method and thus, the translation quality cannot be ensured.

2. The translation quality cannot be improved since the location of the unrestrained item is assigned in accordance with the content of the sentence item information memory unit but not in accordance with the associated item state. For example, if the location of the time lexicon "今天" (today) is assigned to 2, the conventional Chinese generation apparatus only can generate the sentence "我今天畢業."(I graduated today.), but cannot generate the sentence "今天我畢業" (Today I graduated.) that emphases "今天" (today).

3. Since the adjustment of the relative location among the unrestrained item in the same slot is related with the content of the sentence item sequence memory unit, a strange or incorrect Chinese sentence may be generated when the content of the sentence item sequence memory unit is incomplete.

SUMMARY OF THE INVENTION

Therefore, the main object of the present invention is to provide a Chinese generation apparatus for machine translation which can overcome the drawbacks that are associated with the aforementioned prior art.

According to the present invention, a Chinese generation apparatus for machine translation which utilizes statistic information instead of a large number of semantic, grammatical and phrase structural rules and which converts the dependency structure of an input Chinese sentence into a Chinese sentence, comprises:

a statistic information memory unit for storing the argument item of the dependency structure of the Chinese sentence, the possible sentence pattern, the possible case marker arrangement of each slot and the corresponding probability value;

an accessory item information memory unit for storing the case marker, the source language surface case marker, the argument semantic code, the semantic code of the modifier and the corresponding phrase head surface case marker and phrase tail surface case marker;

a main item location determining unit for retrieving the sub-structure from the dependency structure of the input Chinese sentence, for retrieving the corresponding possible sentence pattern and the corresponding possible case marker arrangement in each slot and the corresponding probability value from the statistic information memory unit with the main argument of the sub-structure as the searching key, and for orderly generating the Chinese phrase structure in accordance with the evaluation function;

an accessory item generating unit for retrieving the case marker of the leaf node item, the source language surface case marker, the argument semantic code and the corresponding node item semantic code as searching key from the Chinese phrase structure, for retrieving the phrase head surface case marker and the phrase tail surface case marker from the accessory item information memory unit in accordance with the searching key, and for orderly generating the preposition structure for the Chinese phrase structure; and a post processing unit for retrieving each clause structure from the Chinese phrase structure, for generating the question sentence or the "把" ("ba") sentence or the negative sentence or the passive sentence or the imperative sentence and the corresponding tense marker and punctuation, and for converting the Chinese phrase structure into the Chinese sentence with the use of the lining approach.

According to the Chinese generation apparatus for machine translation of the present invention, the main item location determining unit retrieves the sub-structure from the input dependency structure, retrieves the corresponding possible sentence pattern and the corresponding possible case marker arrangement in each slot and the corresponding probability value from the statistic information memory unit with the main argument of the sub-structure as the searching key, orderly generates the Chinese phrase structure in accordance with the evaluation function, and stores the Chinese phrase structure in the buffer unit. Then, the accessory item generating unit retrieves the Chinese phrase structure from the buffer unit, retrieves each leaf node, retrieves the case marker of the leaf node, the source language surface case marker, the argument semantic code and the corresponding node item semantic code as searching key from the Chinese phrase structure, retrieves the phrase head surface case marker and the phrase tail surface case marker from the accessory item information memory unit in accordance with the searching key, and generates the preposition structure in the corresponding location of the Chinese phrase structure.

Then, the post processing unit retrieves each clause structure from the Chinese phrase structure, performs the generation of the question sentence, the "把" ("ba") sentence, the negative sentence, the passive sentence, the imperative sentence and the corresponding tense marker and punctuation in accordance with the Chinese grammatical rules, and finally retrieves the generated Chinese sentence with the use of the lining approach and outputs the generated Chinese sentence to the output unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

In order to reduce the total number of semantic, grammatical and special syntactic rules that are needed in the generation of Chinese in machine translation, it is found that statistic information is essential. Due to the advent of tagged Chinese balanced corpus in domestic market, we can simply some software tools to extract the desired information from the corpus location in place of the rules used in machine translation, for example the basic sentence patterns derived from verb or adjective and the probability that various item appears in basic sentence patterns. In addition, by the use of simple operation means, such as the operation of conditional probability, probability information is easy to generate other relative probability information, for example, three word or four word interconnecting probability information may be derived from the single word probability information and two word interconnecting probability information.

Figure 1:
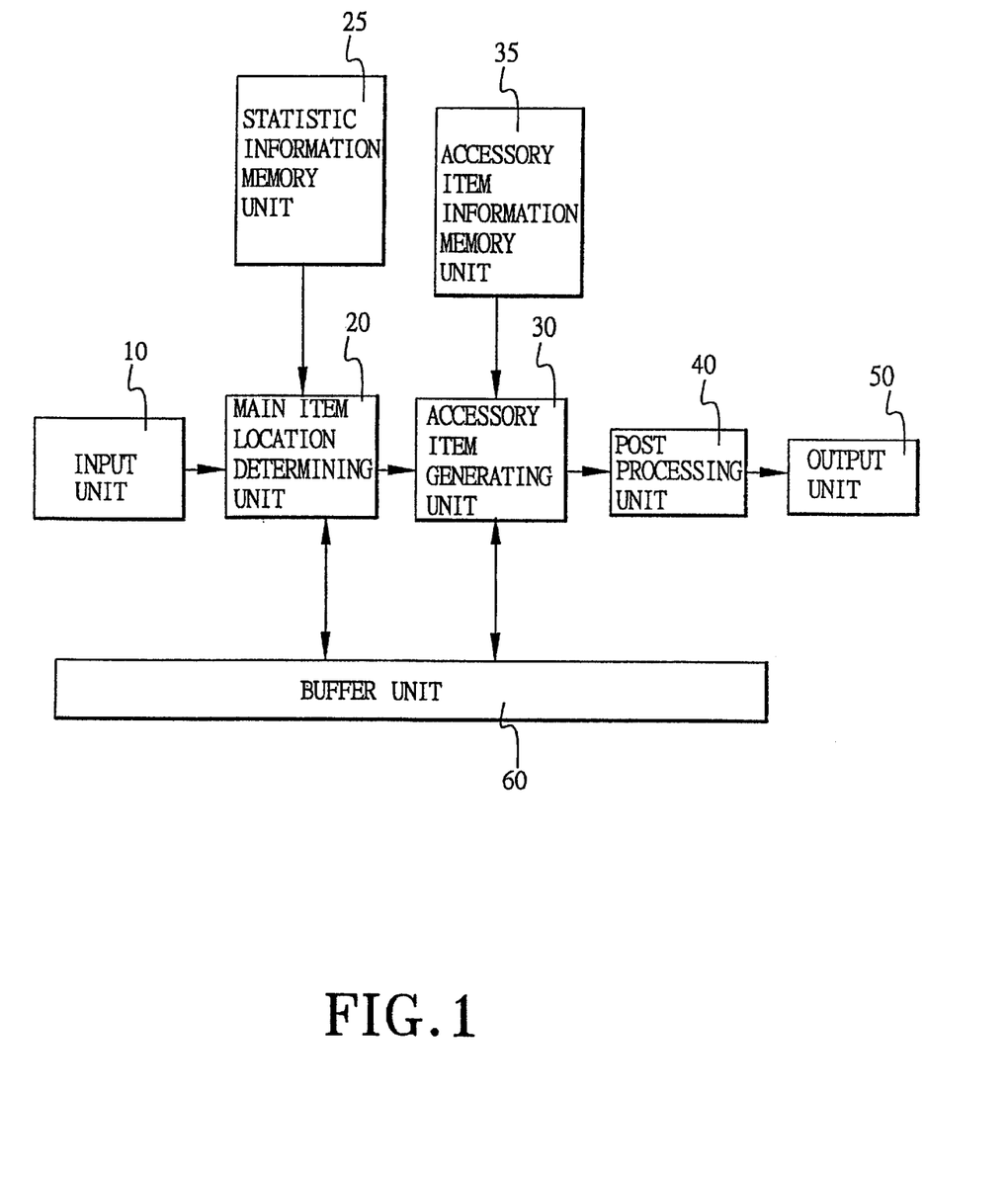
FIG. 1 is a system block diagram of a Chinese generation apparatus for machine translation according to one embodiment of the present invention.
Figure 5:
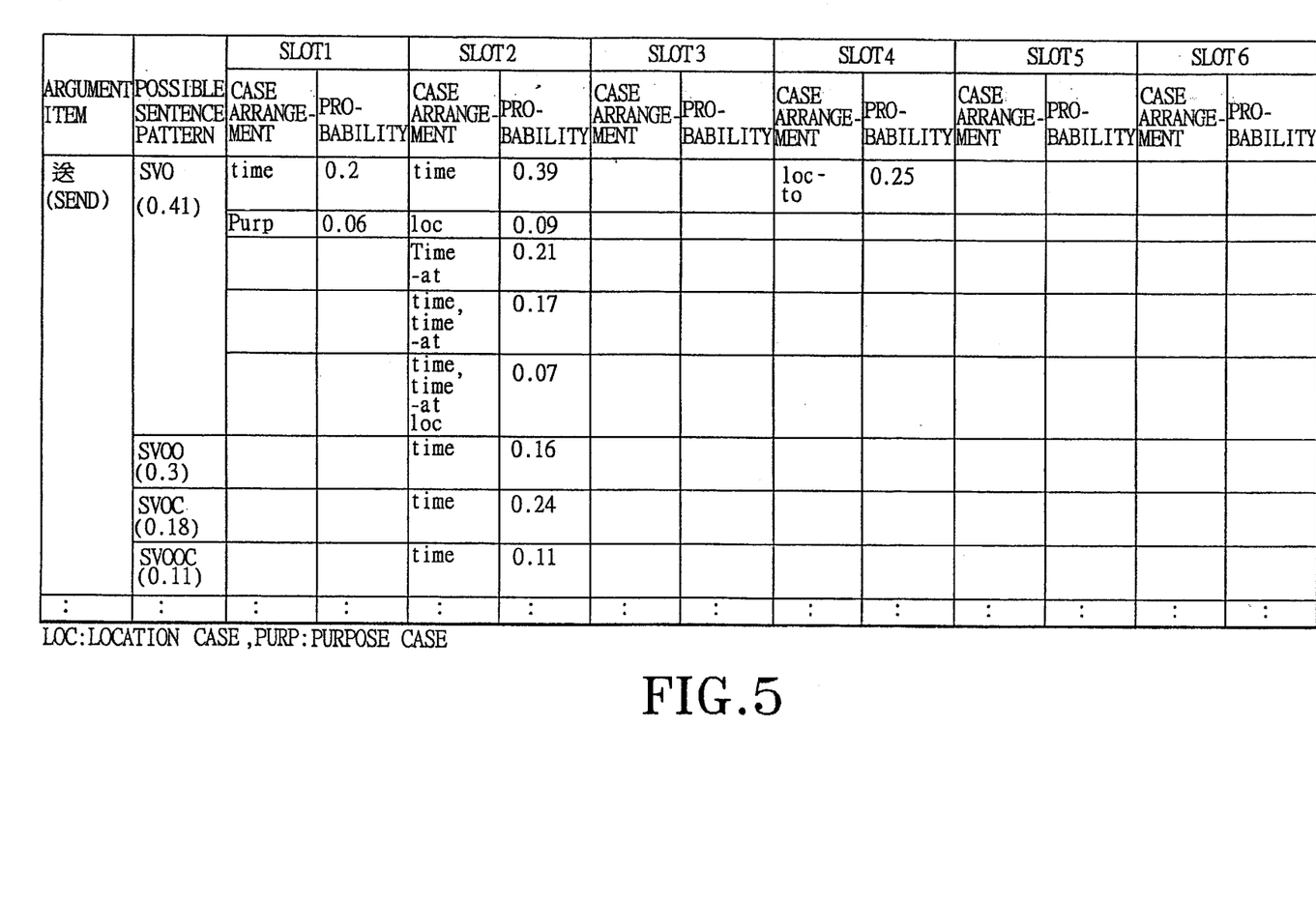
FIG. 5 is a schematic structural concept diagram of the statistic information memory unit according to the embodiment of the present invention.
Figure 7A:
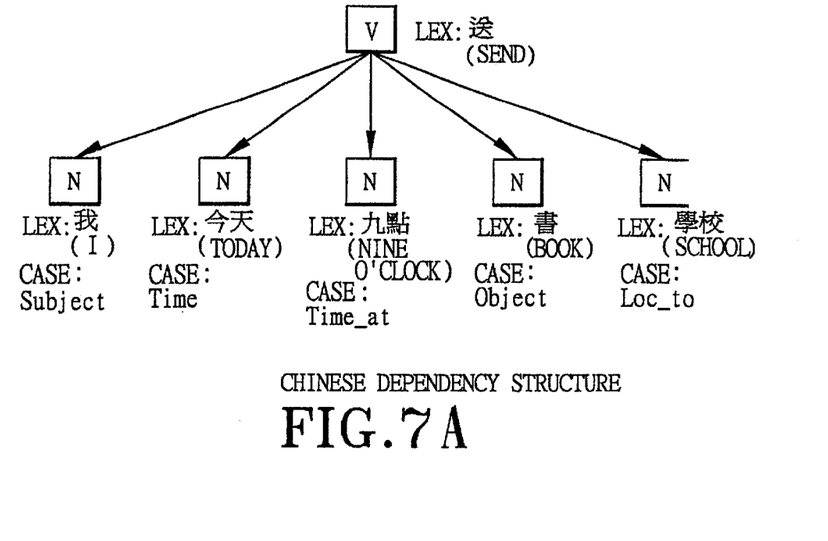
FIGS. 7A to 7D are schematic diagrams for explaining the process of the present invention.

FIG. 1 is a schematic system block diagram of a Chinese generation apparatus for machine translation according to the present invention. 10 denotes an input unit for inputting Chinese dependency structure. Taking Japanese-to-Chinese machine translation as an example, Chinese dependency structure is obtained from a Japanese sentence by the Japanese parsing process and the intermediate structure conversion. For example, as shown in FIG. 7A, a verb V is referred as an argument, and leaf nodes, such as "我", "今天", are the modifiers of the above argument. Reference numeral 25 denotes a statistic information memory unit for storing the argument item of Chinese sentence dependency structure as searching key, and the possible case arrangement and the corresponding probability value of the corresponding possible sentence pattern and each slot in each sentence pattern (for example, slot 1 to slot 6 in the drawing), the schematic structural concept diagram of the memory unit 25 being shown in FIG. 5.

Figure 2:
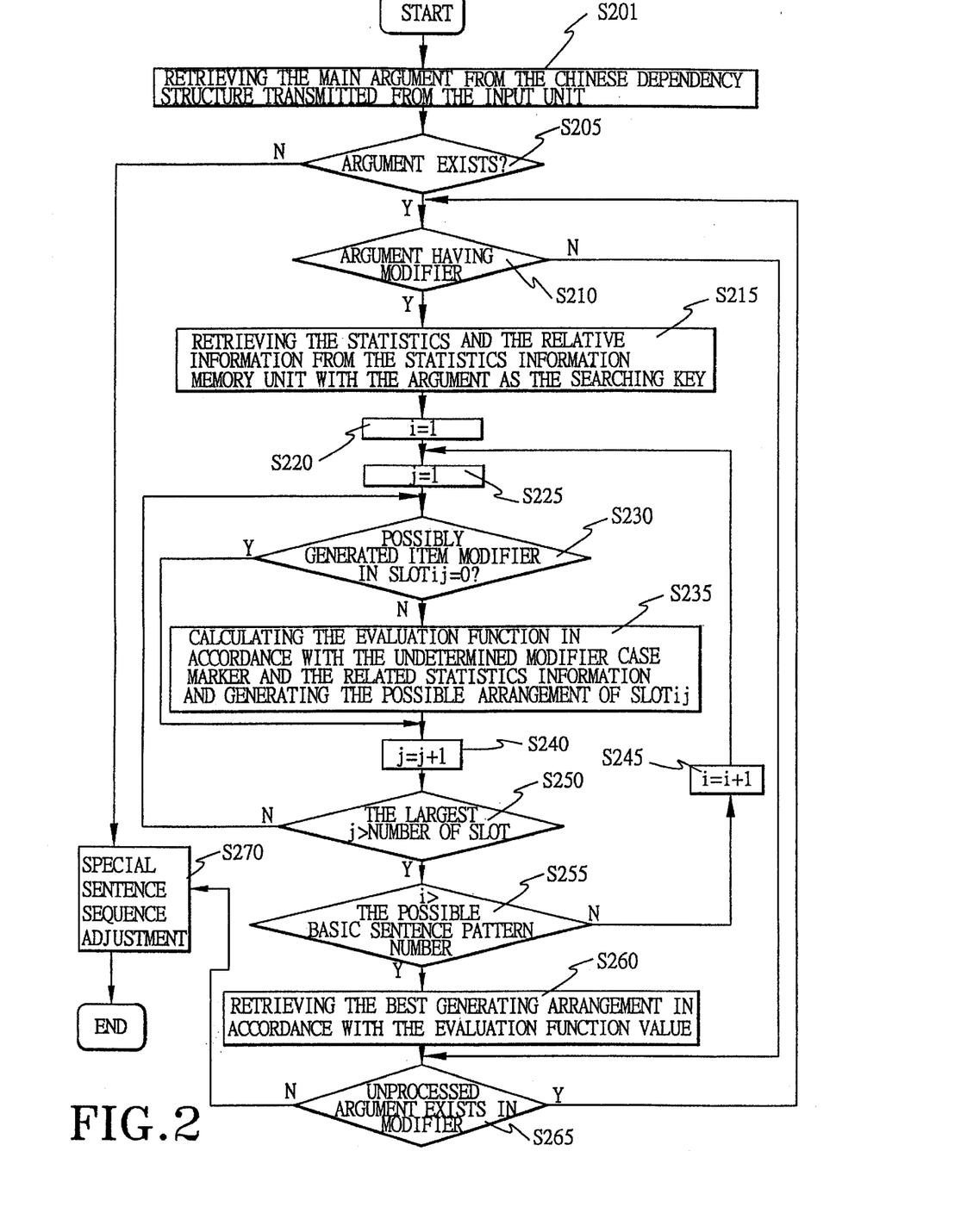
FIG. 2 is a process flow chart of the main item location determining unit according to the embodiment of the present invention.
Figure 6:
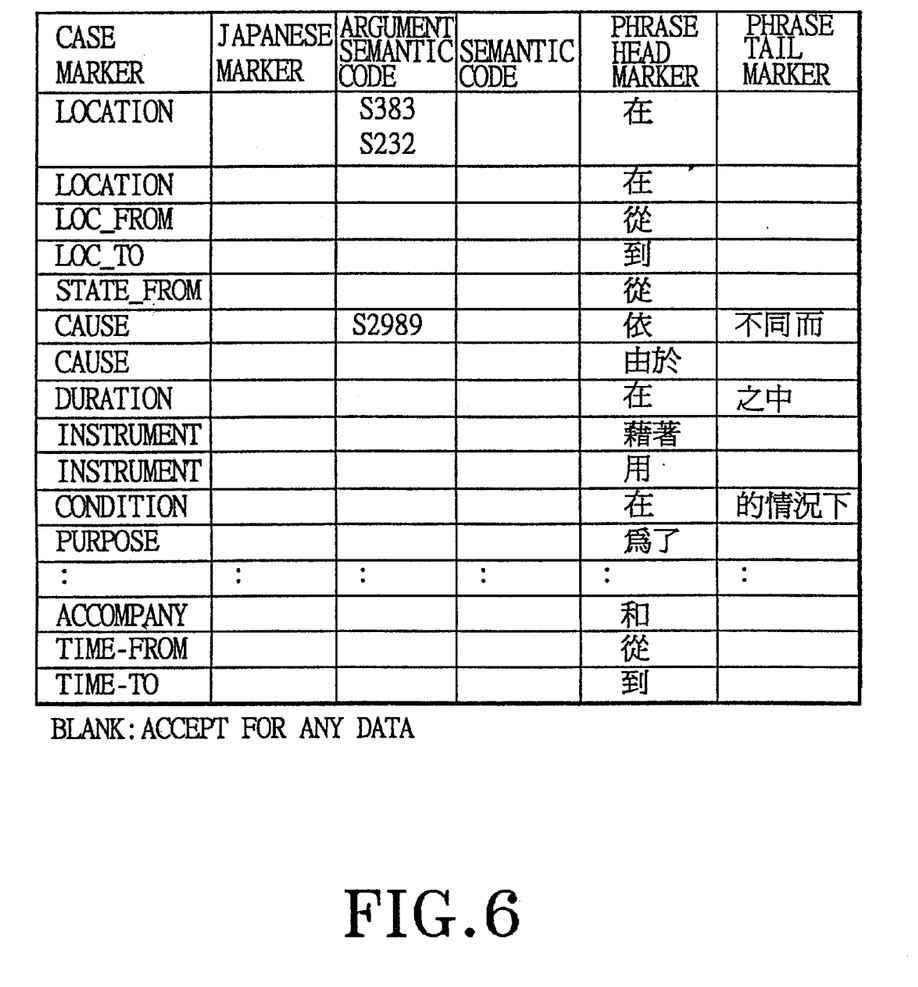
FIG. 6 is a schematic structural concept diagram of the accessory item information memory unit according to the embodiment of the present invention.

Reference numeral 20 denotes a main item location determining unit for respectively retrieving the relative information from the statistic information memory unit 25 with the argument of each sub-structure as the searching key, and for determining the best basic sentence pattern and the relative generation location of other item and generating Chinese phrase structure with the best path searching approach, such as branch-and-bound method, the process flow chart being shown as FIG. 2. Reference numeral 35 denotes an accessory item information memory unit for storing the case marker, the Japanese marker, the argument semantic code, and the semantic code as searching key and the corresponding phrase head and phrase tail marker, as best shown in FIG. 6.

Figure 3:
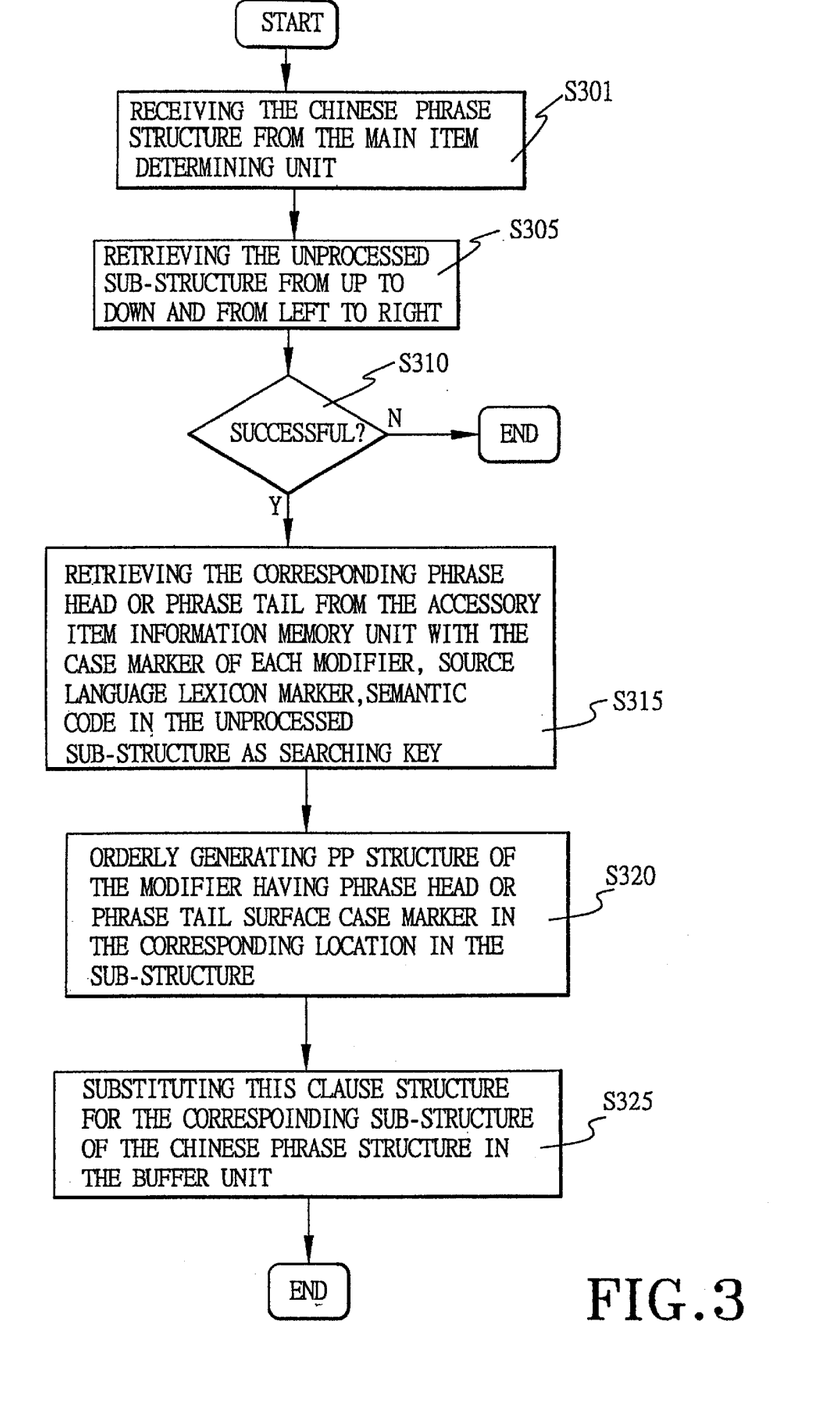
FIG. 3 is a process flow chart of the accessory item generating unit according to the embodiment of the present invention.

Reference numeral 30 denotes an accessory item generation unit for generating Chinese preposition structure by retrieving the corresponding phrase head and phrase tail marker in the corresponding location of the Chinese phrase structure from the accessory item information memory unit 35 by retrieving each leaf node with its case marker, Japanese marker (and Japanese lexical item), argument semantic code and semantic code of itself as searching key, the process flow chart being shown in FIG. 3. Reference numeral 40 denotes a post processing unit for generating Chinese sentence from Chinese phrase structure with lining approach and outputting the Chinese sentence after performing the negative, question, imperative, "把" ("ba") sentence, passive, time marker and punctuation processes, the processing flow chart being shown in FIG. 4.

Reference numeral 50 denotes an output unit which is composed of, for example, a monitor, and reference numeral 60 denotes a buffer unit for temporally storing the intermediate result.

FIG. 2 is the processing flow chart of the main item location determining unit 20. After retrieving the main argument from the Chinese dependency structure transmitted from the input unit 10 in step S201, it is determined whether the main argument is existed in step S205. If the main argument is not existed, i.e. no clause exists, the process proceeds into step S270 to perform the special sentence sequence adjustment, for example, the complex phrase "進入禁止" ("No Trespassing" in Japanese) is adjusted to "禁止進入" ("No Trespassing" in Chinese). The process is end after the performance of step S270. If it is determined in step S205 that the main argument exists, step S210 is performed to determined whether the modifier is exist. If no modifier is exist, step S265 is performed to determine whether unprocessed clause argument is exist in other modifiers. If no unprocessed clause argument is exist in other modifiers, step S270 is performed and the process is end. Otherwise, the possible case marker arrangement and the corresponding probability value of the corresponding possible sentence pattern and the corresponding slot is retrieved from the statistic information memory unit 25 with the argument item as searching key in step S215.

Afterwards, the initial value of the variable i (possible sentence pattern number) is set to 1 in step S220. Then, the initial value of the variable j (slot number) is set to 1 in step S225. After step S225, the process proceeds into step S230 to determine whether case marker arrangement that is possibly generated is exist in SLOTij. If there has case marker arrangement in SLOTij, the evaluation function value of each arrangement is calculated with the use of the undetermined modifier case marker and the corresponding statistic information, and the case marker arrangement of the highest evaluation value is used as the arrangement of SLOTij in step S235.

After the step S240 in which j is increased by one, it is determined that whether the j value is larger than the largest number of SLOT (the largest number of SLOT is six in the present embodiment) in step S250. If the j value is not larger than the largest number of SLOT, the process returns to the step S230, otherwise, it is determined that whether the i value is larger than the possible sentence pattern number (one of the results from the step S215) in step S255. If the i value is not larger than the possible sentence pattern number, the process returns to the step S225 after the step S245 in which i is increased by one, otherwise, the best generation arrangement is retrieved in accordance with the evaluation function value in step S260. Then, it is determined that whether unprocessed argument is existed in the unprocessed modifier in step S265. If there has unprocessed argument in the unprocessed modifier, the process returns to the step S210, otherwise, the process is ended after the step S270 in which special sentence sequence is adjusted.

FIG. 3 is the process flow chart of the accessory item generation unit 30. The Chinese phrase structure is transmitted from the main item location determining unit 20 in step S301. The unprocessed clause structure is retrieved from up to down and from left to right in step S305. The process is ended if the retrieving of the unprocessed clause structure is determined to be failure in step S310, otherwise, the corresponding phrase head marker and the corresponding phrase tail marker are retrieved from the unprocessed clause structure in accordance with the accessory item information memory unit 35 with the case marker of the modifier, the source language lexical item marker, and semantic code (of the argument and itself) as searching key in step S315. Then, the modifier having the phrase head and phrase tail markers is generated into the preposition (PP) structure in the corresponding location of the phrase structure in step S320. In step S325, the preposition structure generated in step S320 substitutes for the corresponding clause structure of the Chinese phrase structure stored in the buffer unit 60. Then, the process returns to step S305.

Figure 4:
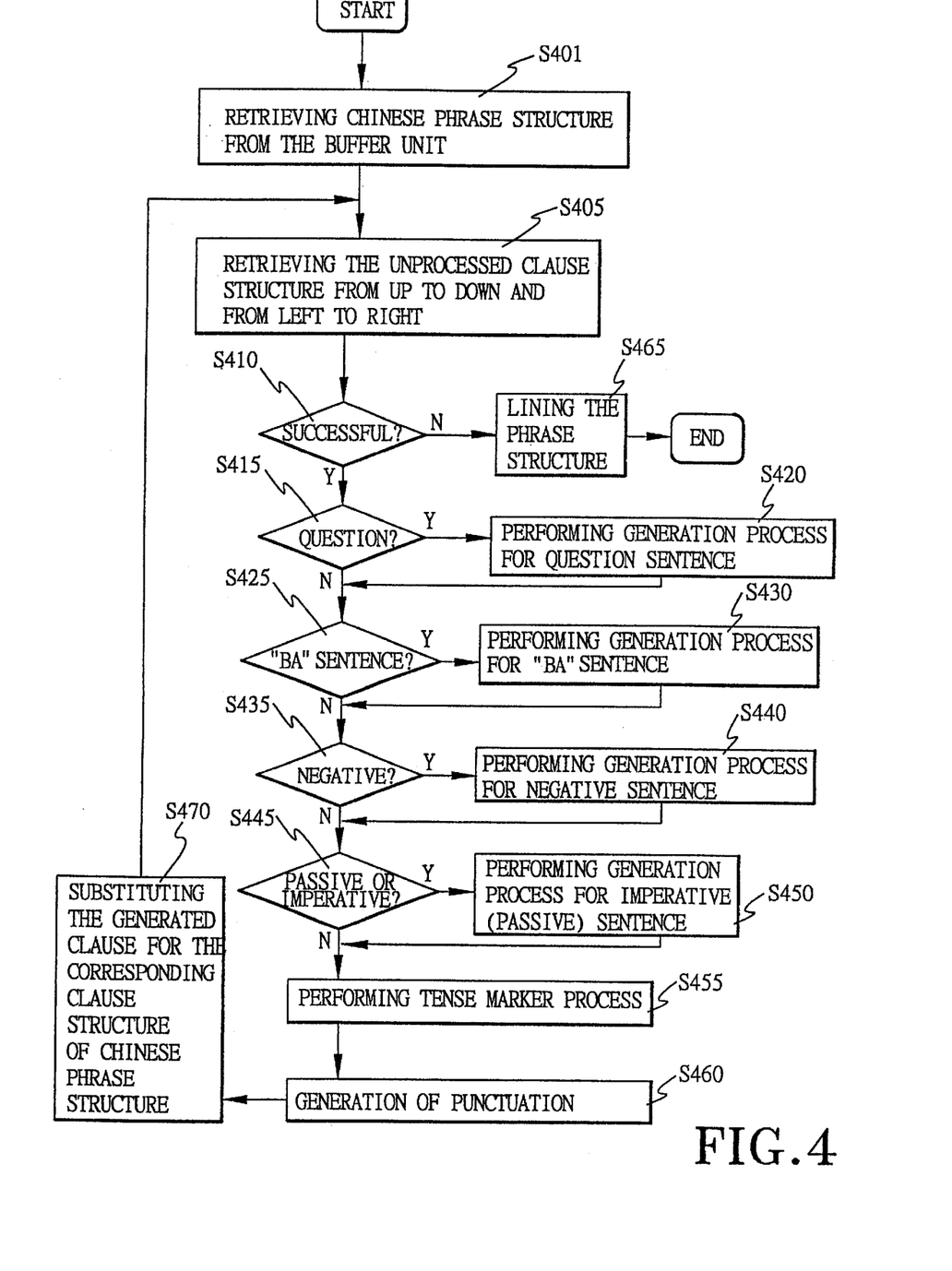
FIG. 4 is a process flow chart of the post processing unit according to the embodiment of the present invention.

FIG. 4 is the process flow chart of the post processing unit 40. The Chinese phrase structure is firstly retrieved from the buffer unit 60 in step S401. Then, the unprocessed clause structure is retrieved respectively from up to down and from left to right in step S405. If the retrieving of the unprocessed clause structure is determined to be failure in step S410, the process is ended after the step S465 in which the Chinese sentence is retrieved by lining the phrase structure, otherwise, it is determined that whether the unprocessed clause structure is a question in step S415. If the unprocessed clause structure is a question, the generation process of the marker of the interrogative "嗎" and "呢" is performed in step S420 and the process proceeds into step S425, otherwise, the process directly proceeds into step S425 after the step S415 to determine that whether it is a "把" ("ba") sentence. If it is a "把" ("ba") sentence, the step S430 is performed to generate a "把" ("ba") sentence and the process proceeds into step S435, otherwise, the process directly proceeds into step S435 to determine that whether it is a negative. If it is a negative, the step S440 is performed to generate a negative sentence and the process proceeds into step S445, otherwise, the process directly proceeds into step S445 to determine that whether it is a passive sentence or an order sentence. If it is a passive sentence or an order sentence, the step S450 is performed to generate a passive sentence or an order sentence and the process proceeds into the step S455, otherwise, the process directly proceeds into the step S455 to perform the generation of the tense marker. Then, the generation of the punctuation is performed in step S460. Afterwards, the generated clause structure substitutes for the corresponding clause structure in the Chinese phrase structure and the process returns to step S405.

The operation of the present invention is further explained as follows by an example. The Chinese dependency structure as shown in FIG. 7A is inputted by the input unit 10. Then, the main item location determining unit 20 operates in accordance with the process flow chart of FIG. 2. Since the argument is "送", the following information can be retrieved in accordance with the statistic information memory unit 25 of FIG. 5:

The possible sentence pattern and its probability value:
SVO 0.41, SVOO 0.30, SVOC 0.18, SVOOC 0.11
(1) The possible case marker arrangement of each slot of the SVO sentence pattern and its probability value:
SLOT1: time 0.2, purpose 0.39
SLOT2: time 0.39, location 0.09, time_at 0.21, time time_at 0.17, time time_at location 0.07
SLOT4: location_to 0.25
(2) The possible case marker arrangement of each slot of the SVOO sentence pattern and its probability value:
SLOT2: time 0.16
(3) The possible case marker arrangement of each slot of the SVOC sentence pattern and its probability value:
SLOT2: time 0.24

Figure 7B:
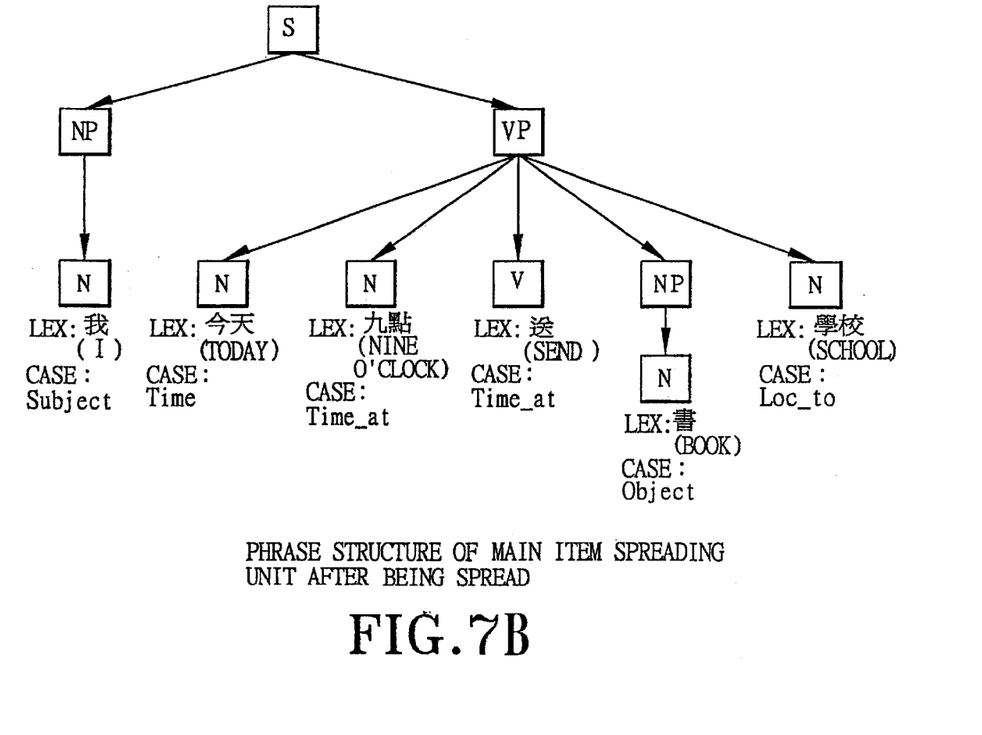
Figure 7C:
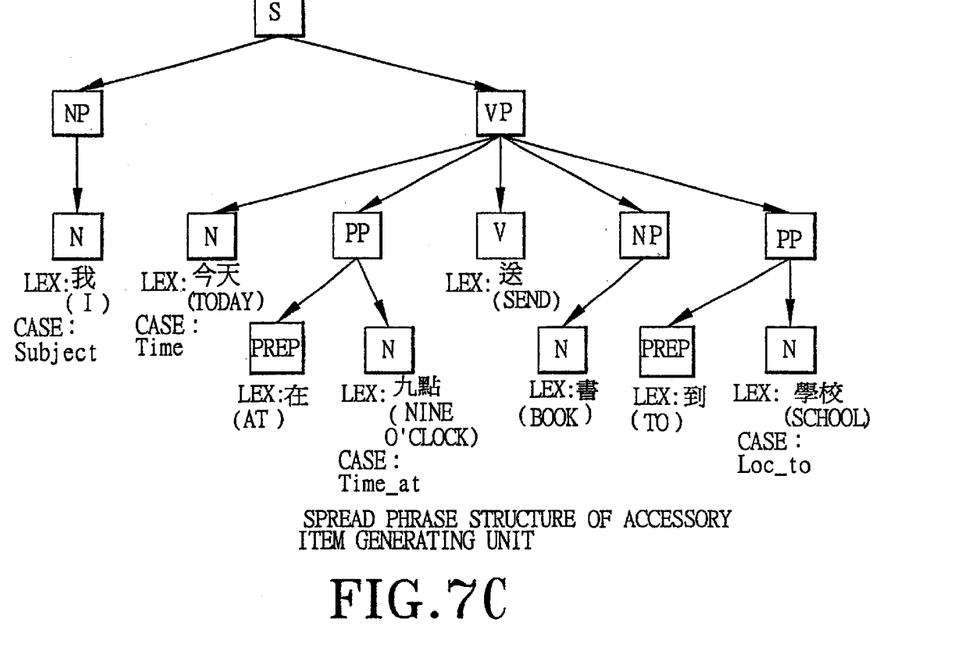

(4) The possible case marker arrangement of each slot of the SVOOC sentence pattern and its probability value:
SLOT2: time 0.11
The largest SLOT number: 6
The possible sentence pattern number: 4
The modifier's case markers in the Chinese dependency structure: subject, time, time_at, object, loc_to The Chinese phrase structure as shown in FIG. 7B may be obtained by the use of the above information and the branch-and-bound algorithm, on the other word, by the calculation result, it is known that the arrangement of the case marker TIME in SLOT2 is better than in SLOT1. Then, the accessory item generating unit 30 respectively retrieves the case marker, Japanese marker, semantic code of each leaf node as searching key in accordance with the Chinese phrase structure in the buffer unit 60, retrieves the corresponding phrase head and phrase tail markers in accordance with the accessory item information memory unit 35 of FIG. 6, for example, the phrase head marker of time_at is "在", and generates Chinese preposition structure, for example, "九點" will be generated into the preposition sentence of "在九點". The generated Chinese phrase structure as this time is shown in FIG. 7C.

Figure 7D:
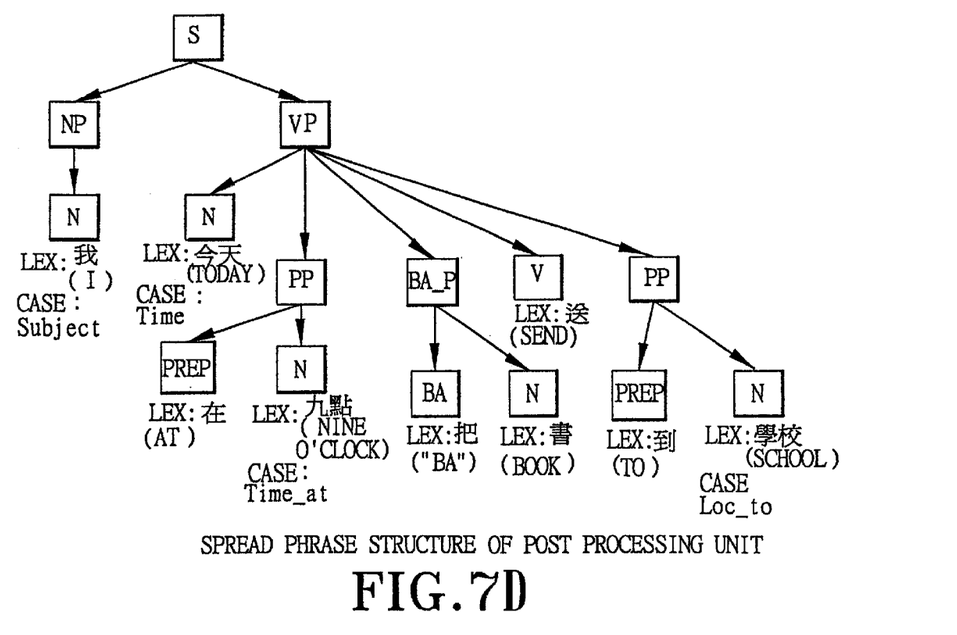

Then, the post processing unit 40 determines that this sentence pattern is a "把" ("ba") sentence, so that a "把" ("ba") sentence process is performed. The Chinese phrase structure generated at this time is shown in FIG. 7D. Using the lining approach, the Chinese sentence "我令天在九點把書送到學校" can be generated. Then, the output unit 50 may output this Chinese sentence to an output device such as a monitor or a printer.

From the foregoing, the apparatus of the present invention can overcome the problems that are associated with the prior art, that is, the advantages of the present invention are:

(1) The number of rules needed for the Chinese generation for machine translation can reduce 1/3 due to the use of statistic data information, thereby greatly increasing the operation efficiency (speed) of the machine translation.

(2) The quality of the Chinese generation can be greatly improved since the difference in the possibly generated sentence pattern can be overcome and the arrangement sequence of each item in the sentence can be determined simultaneously.

(3) The system maintenance become easier as the number of the rules is reduced. Furthermore, since the competition between the rules is reduced, the translation quality is more stable.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements. For example, the source language is not limited to Japanese language, or the language structure inputted can directly be the phrase structure instead of the dependency structure.

What is claimed is:

1. A Chinese generation apparatus for machine translation which converts a dependency structure of a Chinese sentence into a Chinese sentence, said apparatus comprising:

a statistic information memory unit that stores an argument item of the dependency structure of the Chinese sentence, a possible sentence pattern, a possible case marker arrangement of each of a plurality of slots and a corresponding probability value;

an accessory item information memory unit that stores a case marker, a source language surface case marker, an argument semantic code, a semantic code of a modifier and a corresponding phrase head surface case marker and a phrase tail surface case marker;

a main item location determining unit that retrieves a sub-structure from the dependency structure of an input Chinese sentence, retrieves the corresponding possible sentence pattern and the corresponding possible case marker arrangement in each slot and the corresponding probability value from the statistic information memory unit using a main argument of the sub-structure as a searching key, calculates an evaluation function by using an undetermined modifier case marker and a corresponding statistic information and generates a Chinese phrase structure in accordance with the evaluation function;

an accessory item generating unit that retrieves the case marker of a leaf node item, the source language surface case marker, the argument semantic code and the corresponding node item semantic code as a searching key from the Chinese phrase structure, that retrieves the phrase head surface case marker and the phrase tail surface case marker from the accessory item information memory unit in accordance with the searching key, and generates a preposition structure for the Chinese phrase structure; and a post processing unit that retrieves each clause structure from the Chinese phrase structure for generating a question sentence or a "把" ("ba") sentence or a negative sentence or a passive sentence or an imperative sentence and a corresponding tense marker and a punctuation, and converts the Chinese phrase structure into the Chinese sentence with the use of a lining approach.

* * * * *